May 15, 1928.  
P. W. SHIELDS  
BOTTLE WASHER  
Filed Aug. 3, 1923  
1,669,492  
10 Sheets-Sheet 3

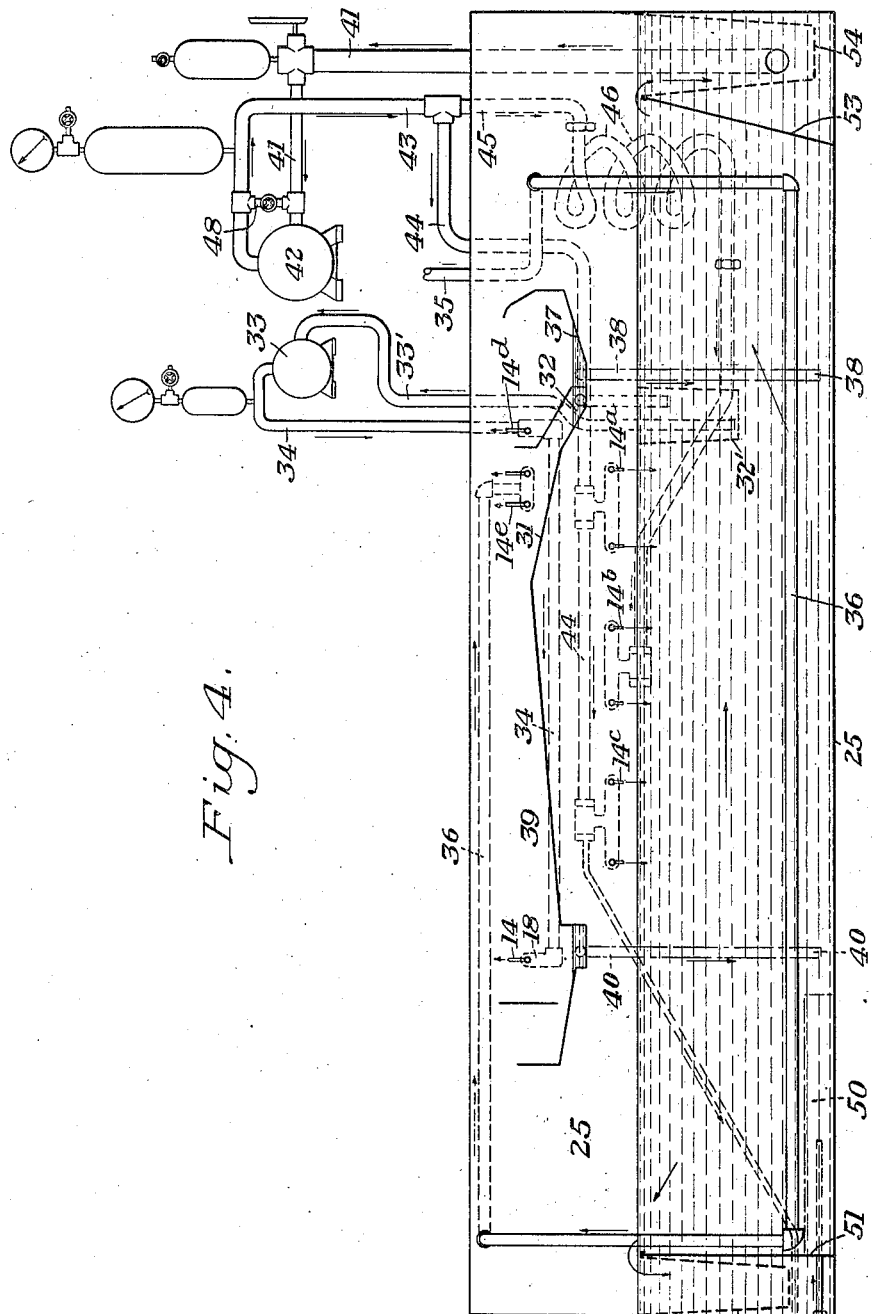

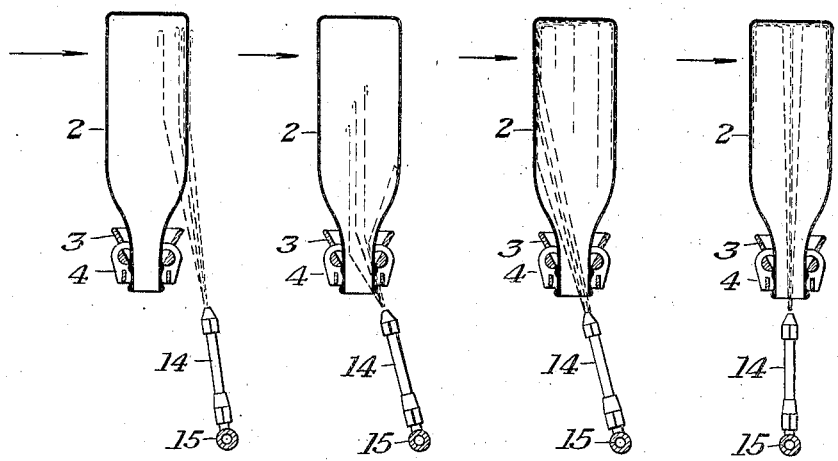
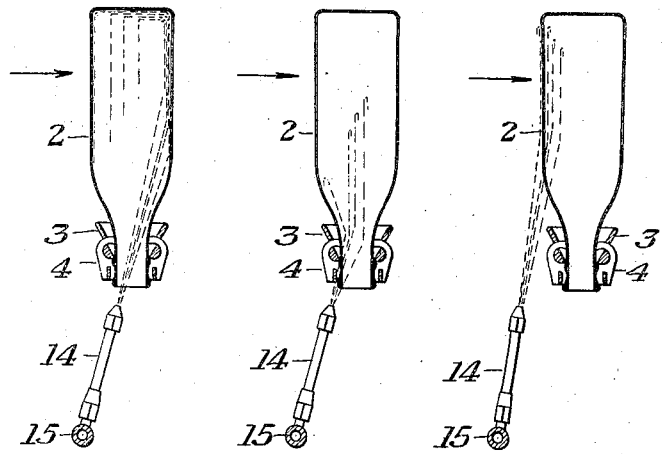

May 15, 1928.

P. W. SHIELDS

BOTTLE WASHER

Filed Aug. 3, 1923    10 Sheets-Sheet 6

May 15, 1928. 1,669,492
P. W. SHIELDS
BOTTLE WASHER
Filed Aug. 3, 1923 10 Sheets-Sheet 8
Fig. 18.
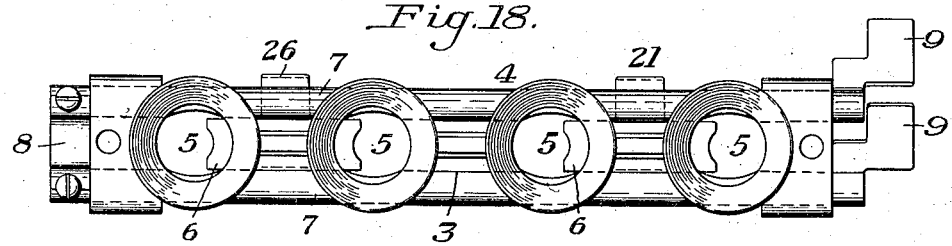
Fig. 19.
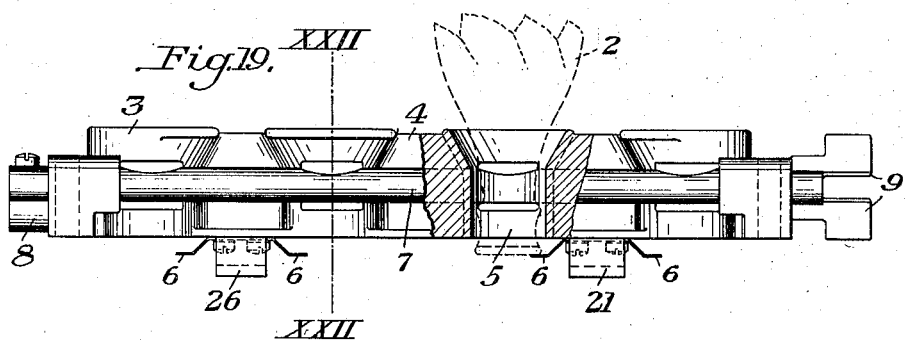
Fig. 20. Fig. 21. Fig. 22.
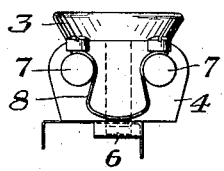 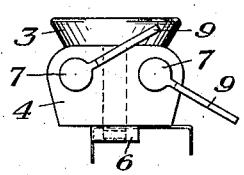 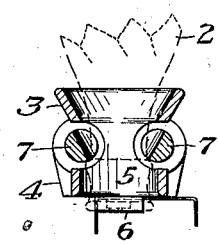
Fig. 24. Fig. 23.
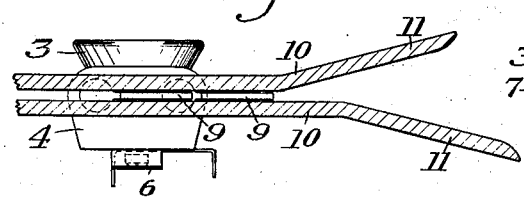 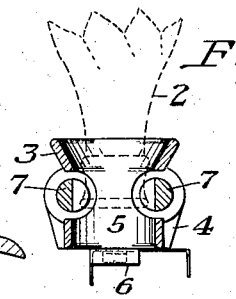
INVENTOR
Patrick W. Shields,
by Byrnes, Stebbins & Parmelee
his attys.

May 15, 1928.  
P. W. SHIELDS  
1,669,492  
BOTTLE WASHER  
Filed Aug. 3, 1923  10 Sheets-Sheet 9
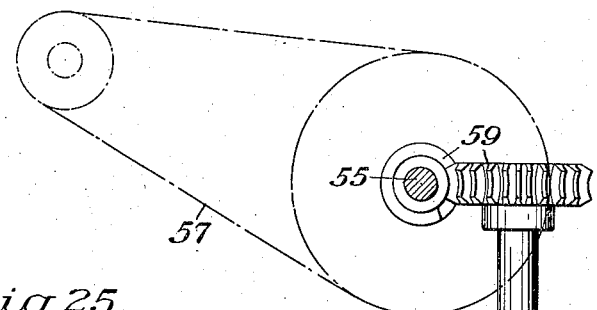
Fig 25.
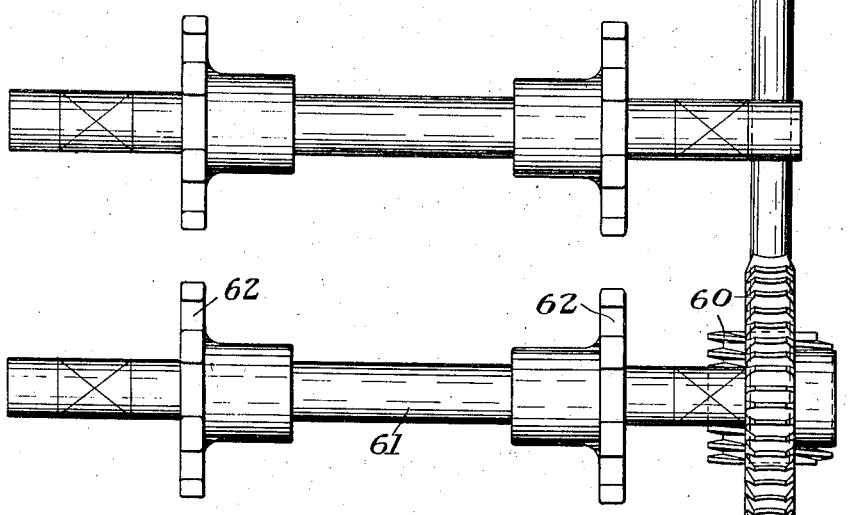

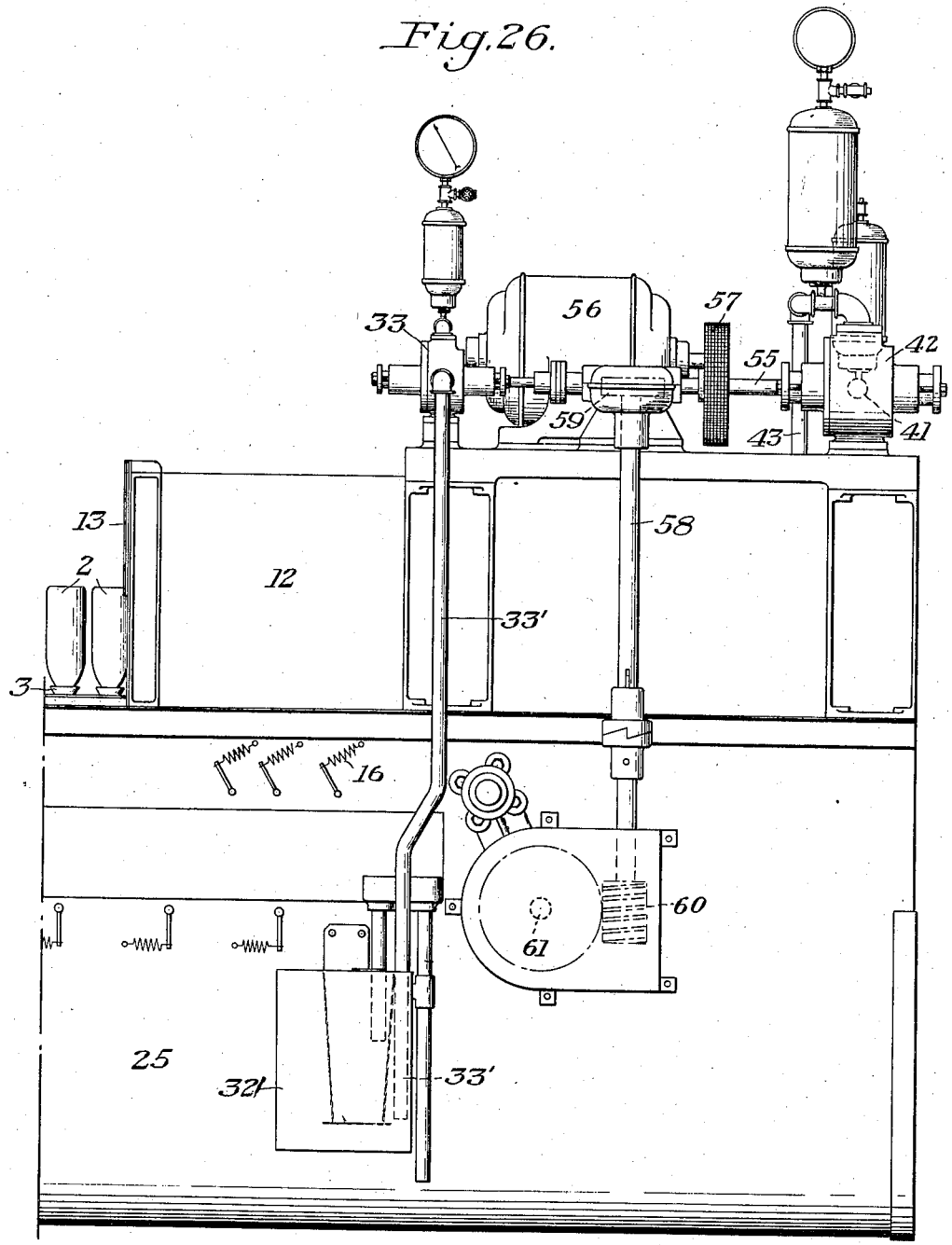

Patented May 15, 1928.

1,669,492

UNITED STATES PATENT OFFICE.

PATRICK W. SHIELDS, OF PITTSBURGH, PENNSYLVANIA, ASSIGNOR TO McKENNA BRASS & MANUFACTURING CO., INC., OF PITTSBURGH, PENNSYLVANIA, A CORPORATION OF PENNSYLVANIA.

BOTTLE WASHER.

Application filed August 3, 1923. Serial No. 655,471.

This invention relates to apparatus for washing bottles and is particularly applicable to washing pop bottles or the like.

I provide a bottle washer in which the bottles are subjected to successive washes of increasing and decreasing temperature. A cleaning solution of caustic soda or the like is preferably used to insure absolute cleanliness of the bottles. This solution is kept hot to insure thorough washing and the bottle is subjected to a preliminary wash and is partially heated before it enters the solution. This is effected by a prelimiary wash at above room temperature. The preliminary wash removes any stale beverage in the bottle, dead flies, and the like, and the bottle is freed from the larger and looser foreign particles before it enters the cleaning solution. The preliminary wash also partially heats the bottle and obviates breakage which would occur if a cold bottle were suddenly plunged into the hot solution. It also lengthens the active life of the cleaning solution since it is not polluted by the major portion of the foreign particles, these being removed before the bottle is subjected to the solution.

The bottles are preferably subjected to the action of the cleaning solution, not only by immersion therein, but also by the action of streams under pressure. I have found that the use of such streams greatly increases the efficiency of the bottle washer. The action of the solution is further enhanced by intermingling the streams with air. This may be done in a number of ways, but I prefer to immerse the bottle in the solution and direct a stream of solution thereon from above the surface of the bath. The stream entrains large quantities of air and the mixture rapidly removes foreign particles, labels and the like, from the bottles.

A plurality of streams of cleaning solution are preferably employed and these streams are preferably of varying temperatures.

After a bottle has passed through the preliminary wash and the bath of cleaning solution, it is rinsed and delivered. This rinsing must be exceedingly thorough and I preferably invert the bottle and subject it to upwardly directed streams of rinse water. A double rinse is preferably employed, not only to insure cleanliness, but also to reduce the temperature of the bottle, which was highly heated in the caustic bath. The final rinse is with fresh water and this water absorbs heat from the bottles. It may then be used again in the preliminary rinse and also in the preliminary wash, if desired.

From the foregoing, it will be seen that after a dirty bottle is inserted in the washer, it is first subjected to a preliminary wash which removes the loose particles and a portion of the adherent matter. It is then plunged into a caustic bath and subjected to streams of fluid intermingled wth air and of successively increasing and decreasing temperatures. After it leaves the solution, it is subjected to a plurality of rinsing operations for insuring absolute cleanliness and reducing the bottle to near room temperature.

The rinsing operation is further aided by collecting means above the bottles which gather a portion of the water sprayed by the rinsing nozzles and direct it downwardly in streams over the bottles. The nozzles are arranged to play on both the outside and the inside of the bottle and the downwardly directed streams are particularly effective for washing the bottoms of the inverted bottles.

I provide a bottle holder having a bottle receiving opening and means for locking the bottle therein. The bottle holders are preferably arranged in the form of an endless chain with a plurality of bottle receiving openings side by side, each set having means for simultaneously gripping or releasing all of the bottles in the set.

I further provide pivoted spray nozzles arranged to rotate about their pivots as the bottles move past the nozzles. This traversing of the nozzles causes the fluid to reach every part of the bottle. The traversing is preferably effected by the bottle holders thus insuring proper cooperation regardless of wear on the conveyer chains. The transversing is also effective for directing the stream on the bottle over a considerable period of time even though the bottle is continuously moving.

In the accompanying drawings illustrating the present preferred embodiment of my invention;

Figure 4 is a diagrammatic view showing the circulatory system;

Figures 5, 6, 7, 8, 9, 10 and 11 are diagrammatic views showing various successive steps in the washing of a bottle as it is traversed by a nozzle;

Figure 18 is a top plan view of a bottle holder;

Figure 19 is a side view, partly broken away, of the bottle holder;

Figures 20 and 21 are end views of the bottle holder;

Figure 22 is a section on the line XXII—XXII of Figure 19 showing the gripping means in normal position;

Figure 23 is a similar view, but showing the grippers in open position;

Figure 24 is a view corresponding to Figure 21, but showing the manner of opening the bottle grippers;

Figure 25 is a schematic view of the conveyer drive; and

Figure 26 is a side view of one end of the washer, showing the driving mechanism and the pumps.

Figure 1:
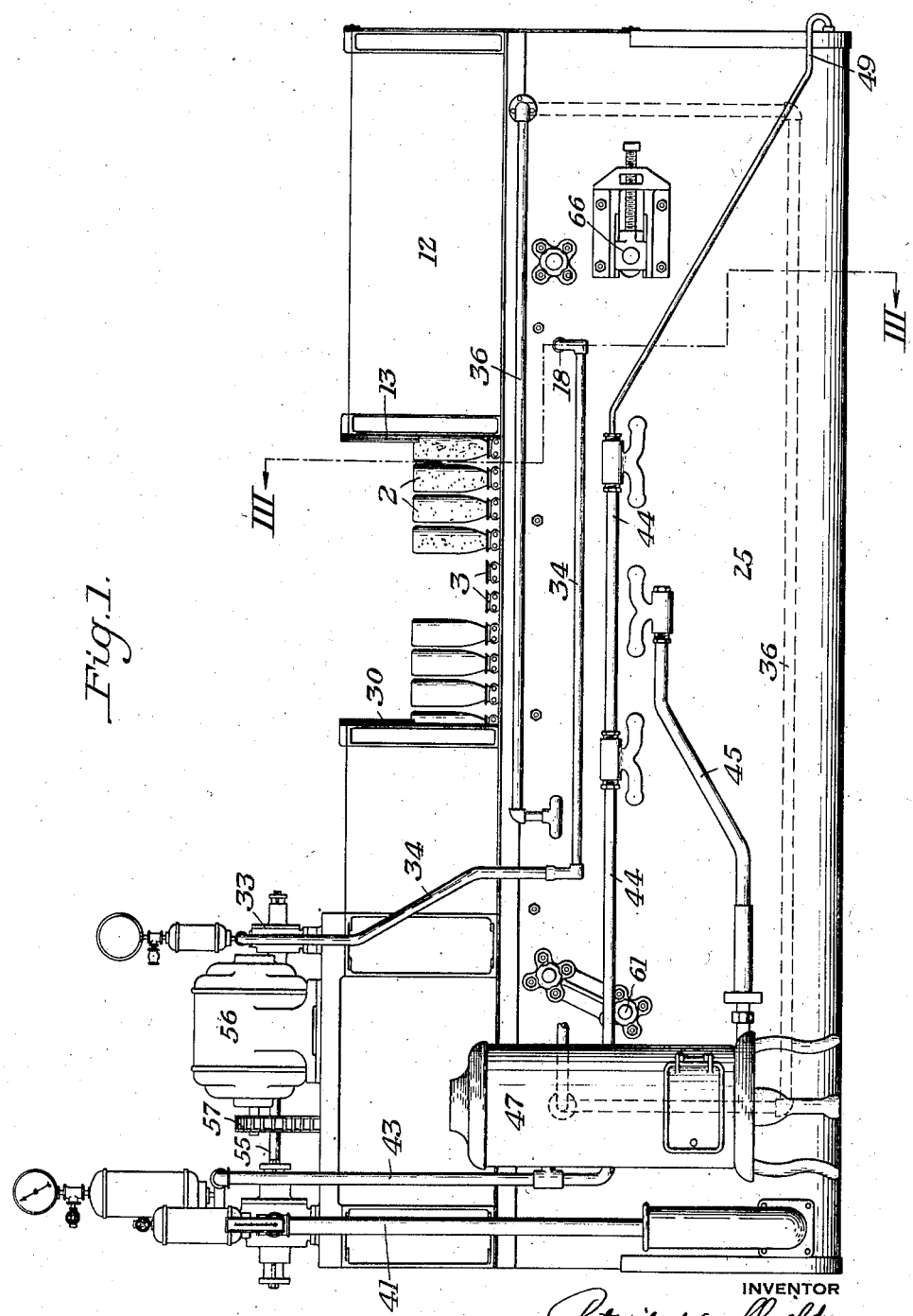
Figure 1 is a side elevation of a bottle washing machine embodying my invention.

In the illustrated embodiment of the invention, the bottles 2 which are to be washed are inverted and placed in bottle holders 3. The bottle holders 3 comprise a frame 4 having a plurality of bottle receiving openings 5 therein. Spring stops 6 provide a yielding means for limiting the distance a bottle may be inserted in the receiving openings 5. A pair of rods 7 are provided for locking the bottles in the openings. These rods are recessed at the openings 5 and are normally held in the position of Figure 22 by a spring 8. Oppositely directed levers 9 on the ends of the rod 7 cooperate with cam bars 10 spaced a distance substantially equal to the thickness of the levers 9 and secured to the frame of the machine for moving the levers into alinement and rotating the locking bars 7. In order to gradually effect the desired movement of the levers and locking bars, the cam bars have diverging ends 11. As a bottle holder moves along, the levers 9 come in contact with the diverging ends 11 and the bars 7 are rotated to the position of Figures 23 and 24. A bottle may then be readily inserted, and, as soon as the holder has passed the cam bars 10, the spring 8 moves bars 7 back to normal position and the non-circular portions grip the neck of the bottle, as shown in Figure 22. The provision of two locking bars insures the centering of the bottle in the holder and leaves a free space all around the neck of the bottle and allows it to be thoroughly washed.

Figure 2:
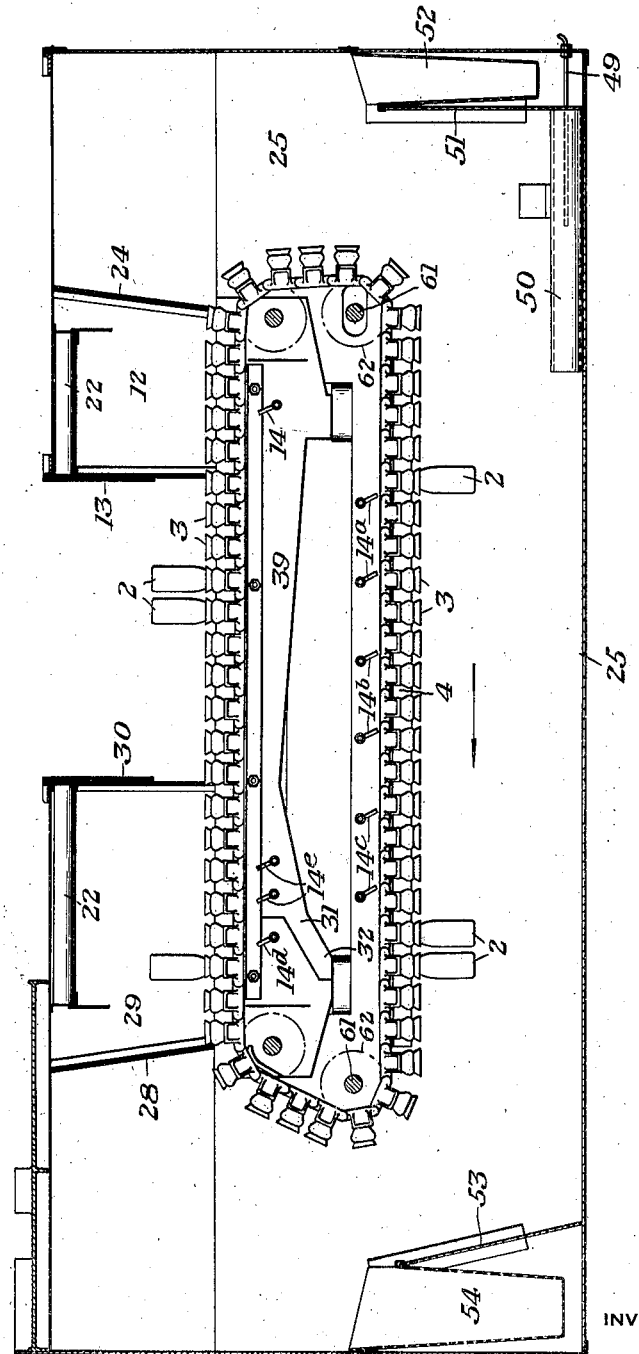
Figure 2 is a vertical section through the machine shown in Figure 1, but with the driving mechanism omitted.
Figure 3:
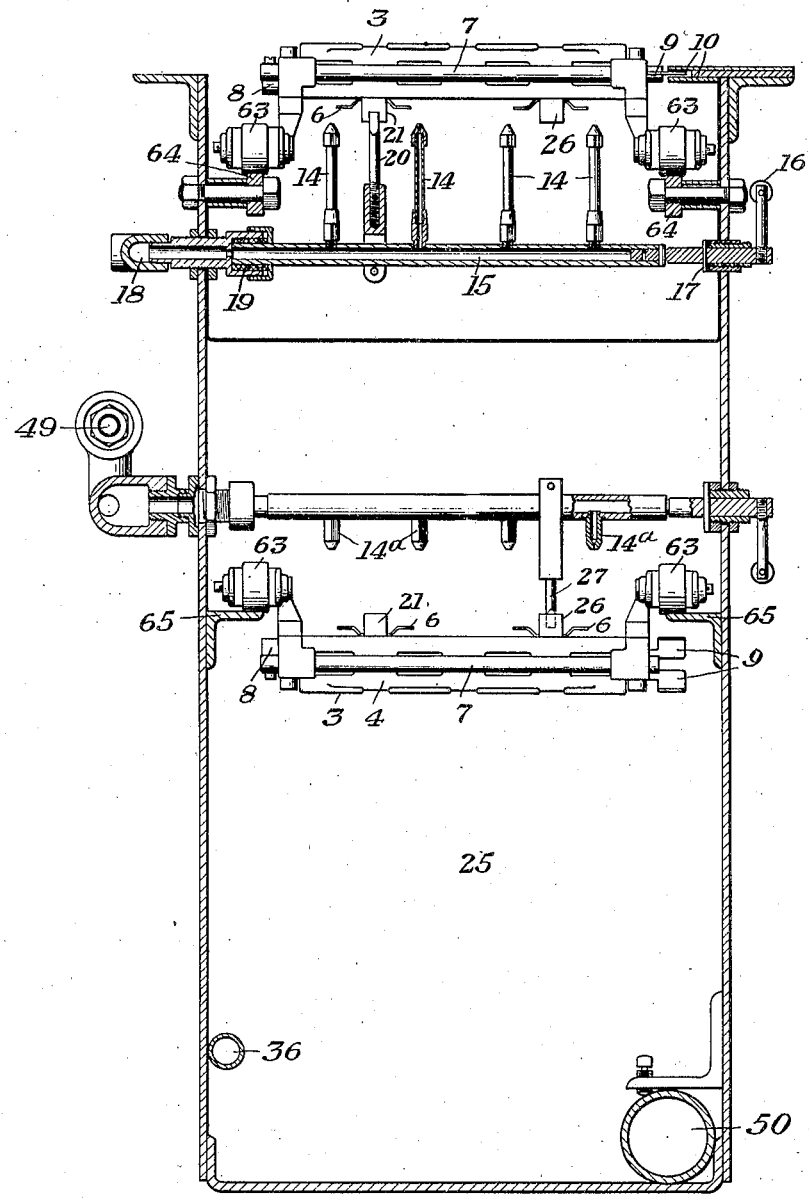
Figure 3 is a section on the line III—III of Figure 1.
Figure 12:
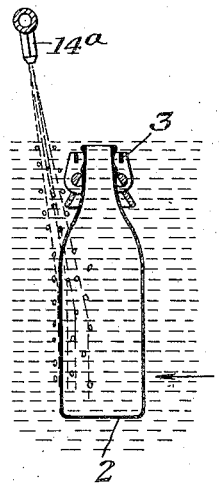
Figures 12, 13, 14, 15 and 16 are diagrammatic views showing successive steps in the washing of a bottle as it is immersed in the bath and traversed by a nozzle.
Figure 13:
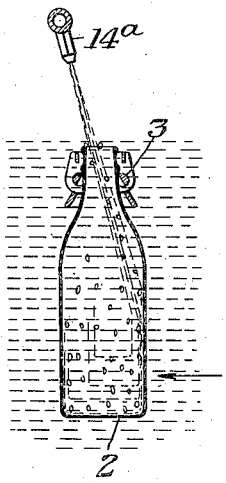
Figure 14:
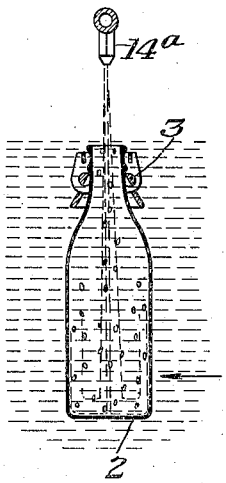
Figure 15:
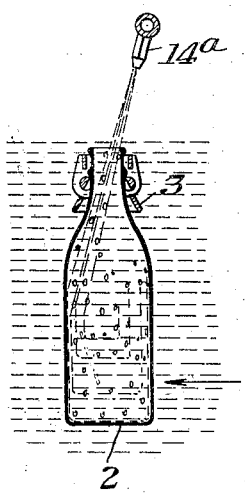
Figure 16:
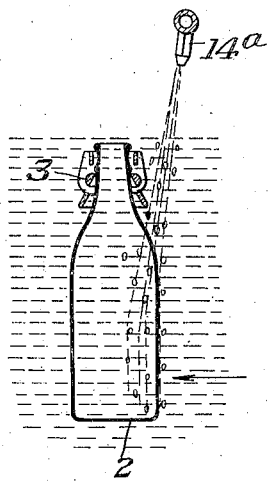

The holders 3 are arranged in the form of an endless conveyer, as best shown in Figure 2. The conveyer is driven at uniform speed and the cam bars are so placed as to release the levers 9 as the bottle passes to the preliminary wash. The gripped bottles pass into a hood 12. Curtains 13 of sheet rubber separate the chamber 12 from the outside and still allow the bottles to enter, while confining the water of the prliminary wash to the chamber and preventing it from splashing outside of the machine.

For preliminary washing the bottles, there are provided nozzles 14, connected to a rotatable water pipe 15 and held inclined toward the incoming bottles by a tension spring 16 and a stop 17. The nozzles are so spaced as to discharge upwardly through the center of the bottle receiving openings 5. Water is continuously supplied from a header 18 through a stuffing box 19, whereby jets of cleaning water constantly issue from the preliminary wash nozzles. As the successive bottle holders move adjacent the nozzles 14, trips 21 thereon engage the adjustable finger 20 on the pipe 15 and rotate the nozzles 14 clockwise, as viewed in Figure 2, whereby the nozzles are traversed by the bottles.

Figures 5 to 11 clearly illustrate the action of a nozzle on a bottle. In Figures 5 to 7, the nozzle is in normal position, the trip 21 not yet having engaged the finger 20. It will be noted that as the bottle moves to the left, the stream from the nozzle plays all over the leading side of the bottle and the point of impact moves down as the bottle advances. In Figure 6, the stream is playing on the outside of the bottle adjacent the neck and inside the bottle holder 3. There is considerable clearance around the rods 7 and the water is free to pass over the neck of the bottle and thoroughly wash it at this ordinarily neglected point. As the bottle advances, the stream gets inside the bottle and thoroughly washes the inner walls, as shown in Figure 7. The trip 21 engages the finger 20 at about this point and rotates the nozzles as the bottle moves forward. The nozzle then sweeps over the entire inside surface of the bottle, as shown in Figures 8 and 9. As the bottle passes out of range of the nozzle, the rearmost side is subjected to the action of the stream, as shown in Figures 10 and 11. At this time, the finger 20 snaps off the trip 21, and the spring 16 returns the nozzle 14 to the position of Figure 5 to act on the succeeding bottles.

Figure 17:
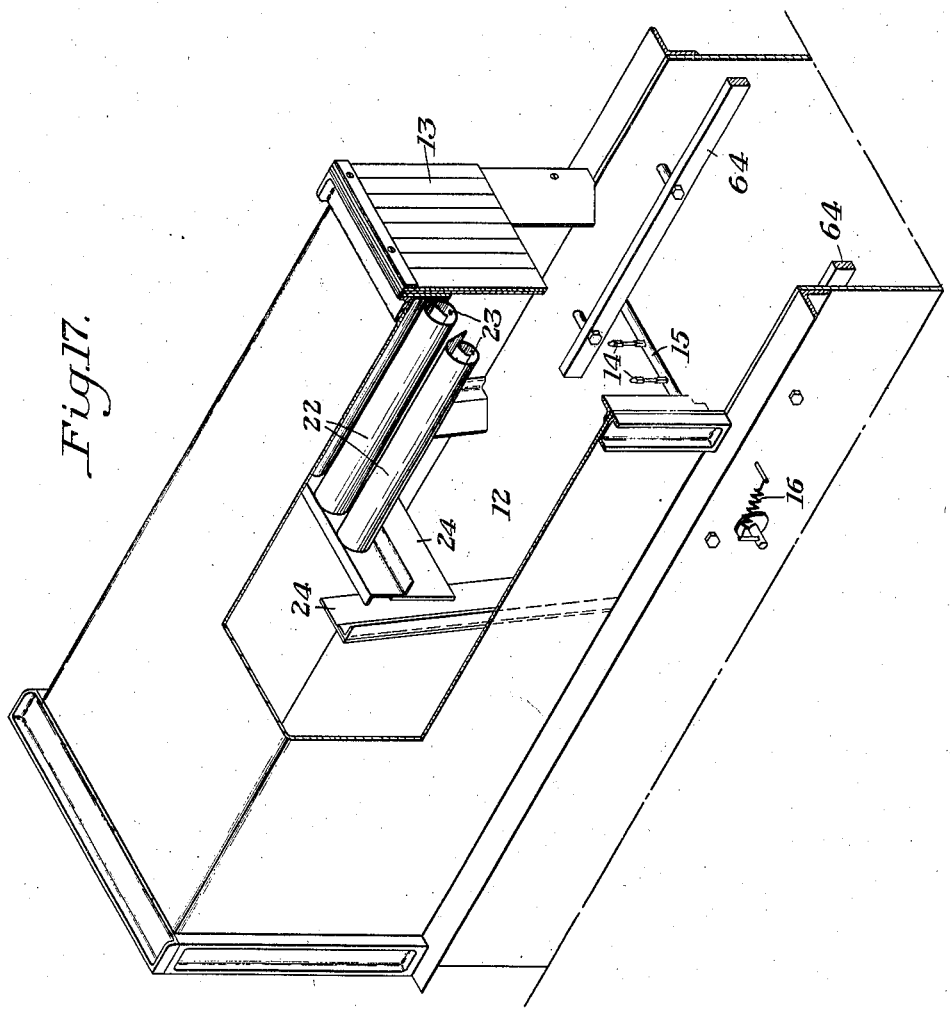
Figure 17 is a perspective view, partly broken away, showing one set of washing nozzles and the collectors for forming the downward streams.

Stale pop, dead flies, and other foreign matter are largely removed by this preliminary wash. The shifting of the axis of the nozzle with respect to the axis of the bottle, or the traversing of the nozzle, as it may be called, insures thorough cleaning, as every portion of the bottle, except the outside bottom, is thoroughly sprayed by the stream from the nozzles 14. It will be seen that a certain amount of water will continue its upward travel where it will be caught by collectors 22 at the top of the chamber 12. The construction of the collectors 22 is apparent from Figure 17, wherein they are shown as comprising strips of metal rolled into spiral form and attached to the top of the chamber. A collector 22 is placed to discharge over each line of advancing bottles and all of the collectors are provided with escape-openings 23. The streams from the openings 23 effectively dislodge any loose matter on the outside bottom of the bottles.

The water used in the preliminary wash is preferably above room temperature, as the heat aids in the washing and also partially heats the bottles. In cold weather, it is particularly important to pre-heat the bottles by the preliminary washing before they are plunged in the hot caustic solution as the pre-heating materially reduces breakage. The advancing bottles leave the chamber 12 through rubber curtains 24 and move downwardly into the main tank 25. This tank is filled with a hot cleaning solution, as of caustic soda. The bottles are immersed in the solution and travel to the left, as viewed in Figure 2. Here they are subjected successively to the action of spray nozzles 14$^a$, 14$^b$ and 14$^c$, respectively connected to their fluid supply in a manner similar to the nozzles 14.

The action of these nozzles is clearly shown in Figures 12 to 16 inclusive. The solution leaves the nozzles under a pressure sufficient to penetrate a considerable distance into the bath. As the stream strikes the surface of the bath, it entrains a considerable amount of air and causes ebullition. As the immersed bottles move under the nozzles, a trip 26 engages an adjustable finger 27 and the nozzles are traversed in the same way as the nozzles 14. The intermingled air and fluid strike practically every surface of the bottle and thoroughly clean it. Any labels are washed off and the bottle is perfectly cleaned by the action of the hot solution. The combined soaking and spraying with a mixture of liquid and air is highly effective for removing impurities from the bottle.

After passing under the nozzles 14$^a$ the bottles pass under nozzles 14$^b$. These also discharge cleaning solution, but at a temperature above that of the nozzles 14$^a$. The increased temperature is further effective for cleaning the bottles. After leaving the nozzles 14$^b$, they pass under nozzles 14$^c$, which discharge fluid at substantially the same temperature as the nozzles 14$^a$. The passage of the bottles through the bath is preferably rather slow and the long immersion in the hot solution and the employment of streams successively increasing and decreasing in temperature leaves the bottles clean, disinfected and ready to rinse.

As the bottles leave the bath, they pass upwardly and through rubber curtains 28 into the rinsing chamber 29. Here they are subjected to a preliminary rinse by nozzles 14$^d$ and a final rinse by nozzles 14$^e$. The successive streams are of decreasing temperature and the heat of the bottle is largely removed before it passes out through curtains 30 for removal from the washer. Separate collectors 22, similar to those in the chamber 12, thoroughly rinse the bottoms of the bottles, as above described.

Clear, fresh, water is used in the nozzles 14$^e$ for the final rinse. As this water strikes the bottles, it absorbs heat therefrom and falls back onto a drain 31 provided with a sump 32 leading to a tank 32' connected by a pipe 33' to a circulating pump 33. The pump 33 supplies this water to the nozzles 14 for the preliminary wash and to the nozzles 14$^d$ for the preliminary rinse, through a conduit 34. As tap water is generally below room temperatures, the fresh water is slightly heated before it passes to the nozzles 14$^e$. The cold water is introduced through a pipe 35 from which it passes through a pipe 36 submerged in the heated solution 25. This serves to warm the final rinse water, thus avoiding sudden chilling of the bottles with the attendant danger of breakage, but does not heat the rinse water sufficiently to destroy its value as a cooling agent for the hot bottles. It will be seen that the water supplied to the nozzles 14$^d$ is substantially clean and at a temperature above that of the final rinse water. The waste water from the nozzles 14$^d$ falls into the portion 37 of the drain 31 from which it passes out through a drain 38. The preliminary rinse removes any of the caustic solution which may still be clinging to the bottles, and since it occurs very shortly after they leave the bath, there is no possibility of drying or crystallization of the solution on the bottles.

The water supplied to the nozzles 14 is warm and quite clean and well adapted for the preliminary washing. The waste water, stale pop and foreign matter fall into a long pan or receptacle 39 and pass off through a drain 40. The pan 39 is beneath the place where the dirty bottles are placed on the machine and where clean ones are taken off.

It thus catches any material which may run out of the bottles before they reach the nozzles 14.

The cleaning solution which is discharged through the nozzles is taken off from the bath by a pipe 41 at the end of the tank 25, where the bottles are withdrawn from the bath. A pump 42 is used for circulating the solution. After the fluid leaves the pump 42, it passes through a pipe 43 and this pipe is divided into two branches, one branch 44 leading directly to the nozzles 14$^a$ and 14$^c$ and another branch 45 leading to the nozzles 14$^b$ through a heating coil 46. The coil 46 is contained in a heater 47 and the solution may be raised to any desired temperature. Shortly after the washer has been put into operation, the entire bath becomes heated due to the circulation through the coil 46, and it will be seen that the fluid discharged by the nozzles 14$^a$ and 14$^c$ is substantially at the temperature of the bath, while the fluid discharged by the nozzles 14$^b$ is hotter. This hot fluid maintains the temperature of the bath and is also highly effective for washing. A by-pass 48 is provided between the pipes 41 and 43 to regulate the quantity of fluid discharged by the lower nozzles.

While a certain amount of circulation is set up by the action of the pump 42, I provide a further means for inducing circulation in the bath. It will be seen that labels and the like will tend to accumulate in the bath and the circulation is important for carrying such foreign matter to some point where it can be collected and taken off. To induce such circulation, a small pipe 49 leading off from the pipe 44 is provided. This pipe discharges into the tank 25 near the bottom and at the end, remote from the pipe 41. The pipe 49 discharges into a tube 50 lying on the bottom of the tank 25 and extending lengthwise thereof. A dam 51 extending across the tank and up to near the surface of the bath closes off this end of the tank, and the tube 50 terminates in this dam. As fluid under pressure is discharged from the pipe 49, it induces a considerable flow through the pipe 50 and consequently over the dam 51. A basket 52 between the dam 51 and the end of the tank 25 catches any labels or other foreign matter which may be carried over the dam. A similar dam 53 and basket 54 are provided at the other end of the tank, and any liquid passing into the suction pipe 41 must travel over the dam 53 and through the basket 54. The above agencies combined with the movement of the bottles through the bath induce considerable circulation therein and prevent the accumulation of labels and foreign matter anywhere except in the baskets 52 and 54. These baskets are removable and may be readily cleared of foreign matter which has been collected.

The pumps 33 and 42 are mounted on a common shaft 55 driven by a motor 56 through a chain belt 57. A substantially vertical shaft 58 is driven from the shaft 55 through worm gearing 59. Worm gearing 60 at the bottom of the shaft 58 transmits power to a sprocket shaft 61 carrying sprockets 62. The sprockets 62 drive a pair of spaced roller chains 63 to which the bottle holders 3 are attached. Top guides 64 and bottom guides 65 provide suitable runs for the chains and a takeup 66 is provided for tightening the chains from time to time as may be required. It will be apparent that the wear and stretch of the chains does not affect the traversing of the nozzles when a bottle holder passes thereover since the fingers 21 and 26, which move the nozzles, are directly connected to the bottle holders 3.

I provide for washing bottles by subjecting them to a plurality of washes successively increasing and decreasing in temperature. This insures thorough and efficient washing without breaking the bottles. I further provide a preliminary wash for removing a large part of the foreign matter, thus greatly increasing the active life of the cleaning solution. The fresh water which is supplied to the machine is used not only to rinse the washed bottle, but also to pre-rinse and pre-cool the bottle after it leaves the solution and to pre-wash and pre-warm the bottle before it enters the hot solution.

I provide fluid nozzles and means for traversing the bottle with each nozzle thus insuring thorough cleaning of the entire bottle. For both the rinsing and pre-washing operations, I collect a portion of the sprayed water above the bottles and discharge it in streams downwardly thereon. I further provide for subjecting each bottle to a stream of fluid intermingled with air. This air brushing is highly effective for removing adherent matter and thoroughly cleansing the bottle.

I further provide for inducing a circulation in the fluid bath and interpose means in the fluid circuit for collecting solid matter. The provision of dams at each end of the tank and the induced circulation near the bottom thereof keep the tank clean at all times and prevent the accumulation of sludge.

The entire machine is simple, compact and readily accessible. The bottles move continuously and the nozzles are also moved to play on every portion of the bottle. The bottles are gripped by the neck and all sizes may be handled without adjustment. When the larger sized bottles are used, alternate bottle receiving openings in the holders are skipped to make room for the large bodies of the bottles. This does not affect the operation of the washer in any way. The bottle gripping means is simple and efficient. The bottles cannot be forced out of the bottle holders by pressure of the sprays and the entire bottle, including the crowning ring, is accessible to the sprays while in the holder.

While I have shown one form of my invention, it will be understood that it is not limited to the illustrated embodiment, but may be otherwise embodied within the scope of the following claims.

I claim:

1. In a bottle washer, a bath, means for immersing a bottle therein, a nozzle adapted to play on the bottle from above the surface of the bath, whereby the bottle is subjected to a stream of liquid intermingled with air, and means for traversing the nozzle.

2. In a bottle washer, a fluid bath, means for immersing bottles therein, means outside the bath for spraying the interiors of the bottles while so immersed, and means for circulating the fluid from the bath and through the spraying means.

3. In a bottle washer, a fluid bath, means for moving bottles through the bath while immersed therein, successive means outside the bath for spraying the interiors of the moving bottles while they are in the bath, and means for circulating the fluid from the bath through the spraying means.

4. In a bottle washer, a fluid bath, means for moving bottles through the bath while immersed therein, a plurality of means for spraying the moving bottles while they are in the bath, means for circulating the fluid from the bath through the spraying means, and means for heating at least a portion of the fluid sprayed.

5. In a bottle washer, a fluid bath, means for moving bottles through the bath while immersed therein, means for spraying the moving bottles while they are in the bath, means for circulating the fluid from the bath through the spraying means, and means for heating at least a portion of the fluid sprayed to above the bath temperature after it leaves the bath.

6. A bottle washer including a bath, means for immersing bottles in the bath, and a fluid nozzle above the bath adapted to direct washing fluid into the interior of a bottle submerged in the bath.

7. A bottle washer including a bath, means for moving bottles through the bath, and a plurality of fluid nozzles above the bath, the nozzles being adapted to successively discharge fluid into the interior of a bottle moving through the bath.

8. A bottle washer including a bath, means for moving bottles through the bath, a plurality of fluid nozzles above the bath, the nozzles being adapted to successively discharge fluid on a bottle moving through the bath, and means for traversing the nozzles during such movement of the bottle.

9. In a bottle washer, a bath, means for immersing a bottle therein and moving it through the bath, a nozzle adapted to subject the bottle while so immersed to a stream of fluid intermingled with air, and means for changing the axis of the nozzle relative to the bottle as the bottle moves past the nozzle.

10. In a bottle washer, a bath, means for immersing a bottle therein and moving it through the bath, a nozzle adapted to subject the bottle while so immersed to a stream of fluid intermingled with air, and means for changing the axis of the nozzle relative to the bottle as the bottle moves past the nozzle, the nozzle being so positioned relative to the path of the bottle as to discharge into the bottle during a portion of the movement of the bottle.

11. In a bottle washer, means for playing a fluid stream upwardly against a bottle, and a trough above the bottle adapted to receive fluid sprayed upwardly past the bottle, said trough having openings therein adapted for the discharge of fluid downwardly from the trough onto the bottle.

12. In a bottle washer, a hood, means for moving bottles through the hood, means for playing a fluid stream upwardly against a bottle under the hood, and a trough near the top of the hood adapted to receive fluid which has been sprayed upwardly past the bottle, the trough having discharge openings therein so positioned as to permit fluid collected in the trough to run out and discharge onto the bottle.

13. In a bottle washer, a nozzle adapted to play a fluid stream upwardly, means for moving a line of bottles over the nozzle, and a trough arranged above the bottles and extending along the line of travel thereof adapted to collect liquid sprayed upwardly past the bottles, the trough having discharge openings arranged in a line above the line of travel of the bottles.

14. In a bottle washer, means for moving bottles in a path, a nozzle arranged below the line of travel of the bottles and arranged to play a fluid stream upwardly, means for traversing the nozzle, and a trough arranged above the line of travel of the bottles adapted to receive fluid sprayed upwardly past the bottles at any position of the nozzle, the trough having openings therein adapted for the discharge of collected fluid downwardly onto the bottles.

15. In a bottle washer, an upwardly discharging nozzle and a receiver made of convolutely wound metal, a portion of such receiver constituting a trough, such portion having discharge openings therein so located that discharged fluid runs onto a bottle therebelow, another portion of such convolutely wound receiver presenting a downward opening adapted to receive upwardly sprayed fluid.

16. A bottle washer including a bath, means for immersing bottles therein, a plurality of fluid nozzles arranged to successively direct fluid against a bottle while it is immersed in the bath, and means for supplying fluid to successive nozzles at successively increasing temperatures.

17. A bottle washer including a bath, means for immersing bottles therein, a plurality of fluid nozzles arranged to successively direct fluid against a bottle while it is immersed in the bath, and means for supplying fluid to successive nozzles at successively increasing and then decreasing temperatures.

18. A bottle washer including a bath, means for immersing bottles therein, a plurality of fluid nozzles arranged to successively direct fluid against a bottle in the bath, means for withdrawing fluid from the bath and supplying portions thereof to different nozzles, and means for heating the portions of withdrawn liquid in varying amounts so that the nozzles deliver liquid at successively increasing temperatures.

19. A bottle washer including a bath, means for immersing bottles therein, a plurality of fluid nozzles arranged to successively direct fluid against a bottle in the bath, means for withdrawing fluid from the bath and supplying portions thereof to different nozzles, and means for heating the portions of withdrawn liquid in varying amounts so that the nozzles deliver liquid at successively increasing and then decreasing temperatures.

In testimony whereof I have hereunto set my hand.

PATRICK W. SHIELDS.